US006189850B1

(12) United States Patent
Liao et al.

(10) Patent No.: US 6,189,850 B1
(45) Date of Patent: Feb. 20, 2001

(54) ROTATABLE LCD SCREEN DEVICE

(75) Inventors: Steven Liao; Jen-Hsiang Lee, both of Taipei (TW)

(73) Assignee: Mitac International Corp. (TW)

( * ) Notice: Under 35 U.S.C. 154(b), the term of this patent shall be extended for 0 days.

(21) Appl. No.: 09/098,272

(22) Filed: Jun. 16, 1998

(30) Foreign Application Priority Data

Aug. 9, 1997 (TW) ................................................ 86213546

(51) Int. Cl.[7] .................................................. E04G 3/00
(52) U.S. Cl. .................... 248/292.14; 248/917; 248/918; 248/920; 361/681; 361/682
(58) Field of Search .................................. 248/917, 918, 248/920, 922, 921, 923, 242.14; 361/681, 682

(56) References Cited

U.S. PATENT DOCUMENTS

| 5,329,289 | * | 7/1994 | Sakamoto et al. | 345/126 |
| 5,687,939 | * | 11/1997 | Moscovitch | 248/122.1 |
| 5,854,735 | * | 12/1998 | Cheng | 361/681 |
| 5,873,554 | * | 2/1999 | Nobuchi | 248/278.1 |
| 5,923,528 | * | 7/1999 | Lee | 361/681 |
| 5,941,493 | * | 8/1999 | Cheng | 248/371 |

* cited by examiner

Primary Examiner—Anita M. King
Assistant Examiner—Kimberly Wood
(74) Attorney, Agent, or Firm—Ladas and Parry

(57) ABSTRACT

A rotatable LCD screen device includes a substantially rectangular LCD screen unit which has a length and a width and which includes a front display side and a back side, and an upright support which is connected rotatably to the back side for rotation of the LCD screen unit about a horizontal axis substantially perpendicular to the plane of the front display side so as to place the LCD screen unit in a first position where the length lies horizontally, or a second position where the length extends vertically. A lock mechanism is provided on the back side and the support for locking the LCD screen unit against movement relative to the support when the LCD screen unit is in the first position or the second position. In addition, a limiting mechanism is provided for limiting the angle of rotation of the LCD screen unit relative to the support.

9 Claims, 7 Drawing Sheets

ROTATABLE LCD SCREEN DEVICE

BACKGROUND OF THE INVENTION

1. Field of the Invention

This invention relates to an LCD screen device, more particularly to an LCD screen device which has an upright support for rotatably mounting an LCD screen unit about a horizontal axis perpendicular to the plane of the display face of LCD screen unit.

2. Description of the Related Art

Although conventional computer screens are supported adjustably by supports, they are only adjustable within a limited range substantially about a vertical axis relative to the supports. In addition, conventional computer screens have their longer dimension lying horizontally in order to have a wider view in a horizontal direction. They cannot be changed from a position where the longer dimension lies horizontally to a position where the longer dimension extends vertically so as to have a wider view in a vertical direction.

SUMMARY OF THE INVENTION

The main object of the present invention is to provide a rotatable LCD screen device including an LCD screen unit which can be rotated for placement in a first position where its longer dimension lies horizontally, or a second position where its longer dimension extends vertically.

According to this invention, a rotatable LCD screen device includes a substantially rectangular LCD screen unit which has a length and a width and which includes a front display side and a back side, and an upright support which is connected rotatably to the back side for rotation of the LCD screen unit about a horizontal axis substantially perpendicular to the plane of the front display side so as to place the LCD screen unit respectively in a first position where the length lies horizontally, and a second position where the length extends vertically. A lock mechanism is provided on the back side and the support for locking the LCD screen unit against movement relative to the support when the LCD screen unit is in the first position or the second position. In addition, a limiting mechanism is provided for limiting the angle of rotation of the LCD screen unit relative to the support.

BRIEF DESCRIPTION OF THE DRAWINGS

Other features and advantages of the present invention will become apparent in the following detailed description of the preferred embodiment of the invention, with reference to the accompanying drawings in which.

DETAILED DESCRIPTION OF THE PREFERRED EMBODIMENT

Figure 1:
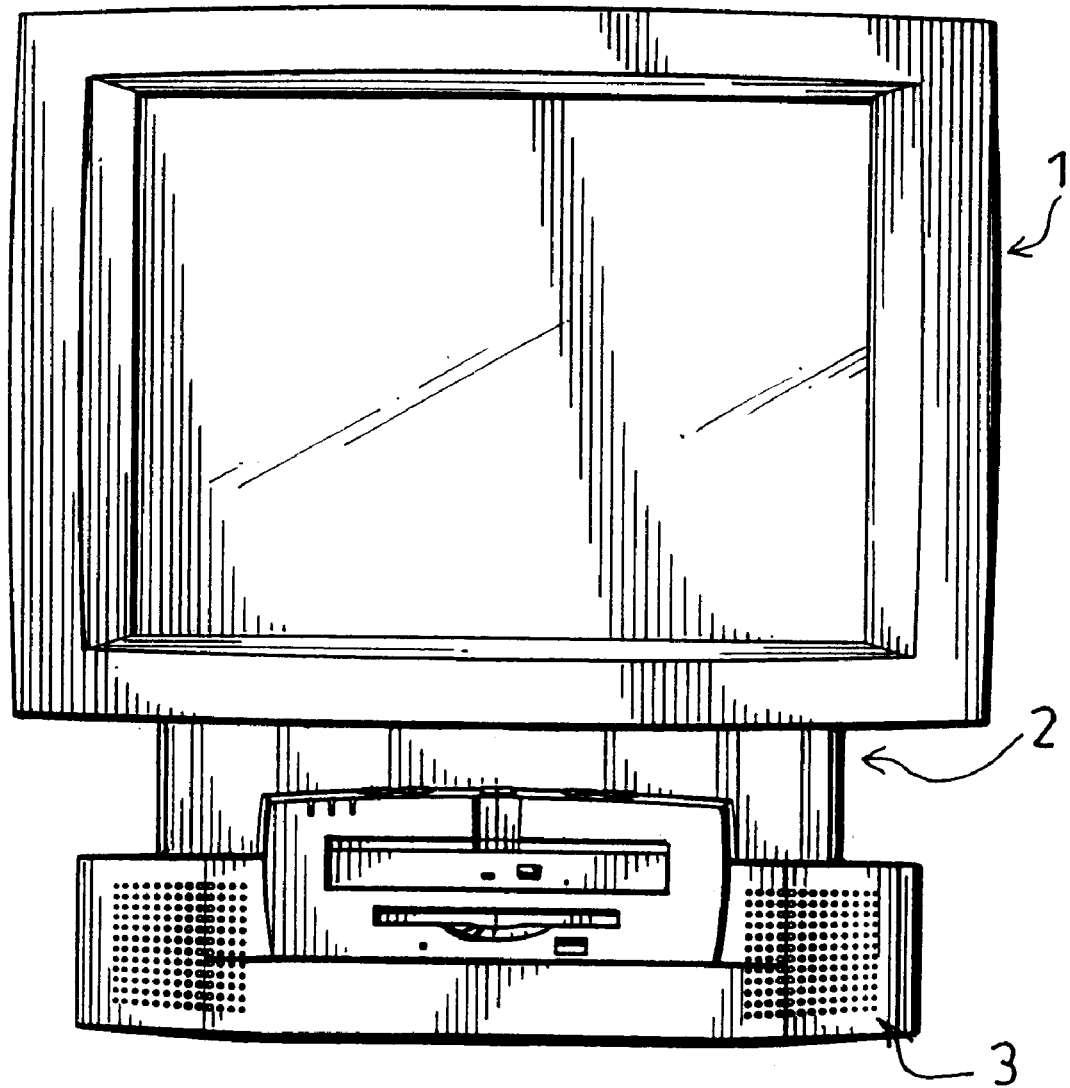
FIG. 1 is a schematic view of a preferred embodiment of an screen device according to this invention when mounted on a computer.

Referring to FIG. 1, the preferred embodiment of an LCD screen device according to the present invention is shown to comprise a rectangular LCD screen unit 1 and an upright support 2 mounted on a computer casing 3 for supporting the LCD screen unit 1.

Figure 2:
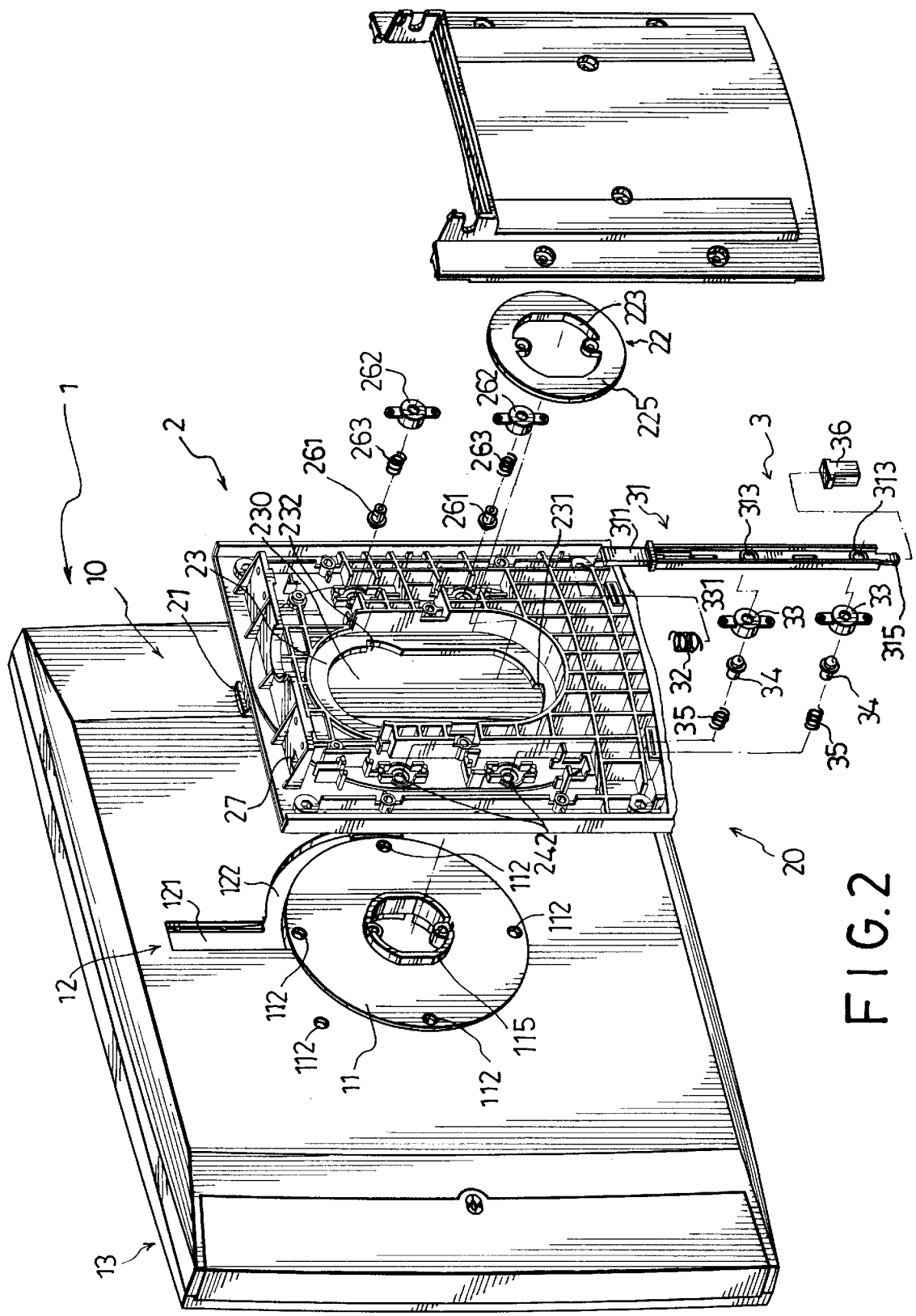
FIG. 2 is an exploded view of the LCD screen device of the preferred embodiment.
Figure 5:
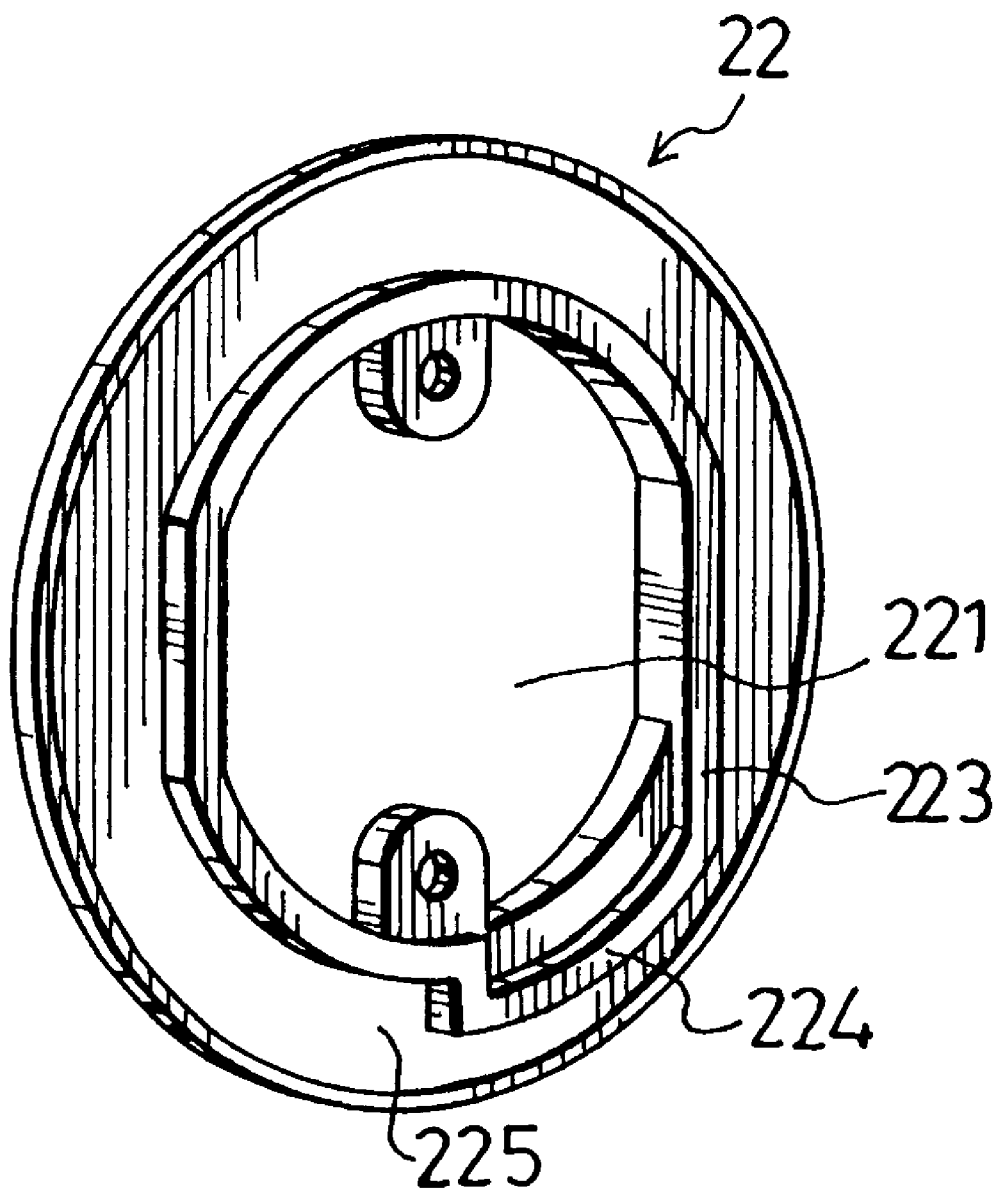
FIG. 5 is a perspective view of a journal member for an LCD screen unit of the LCD screen device according to the preferred embodiment.

As shown in FIG. 2, the LCD screen unit 1 includes a front display side 13 and a back side 10. The back side 10 has a central portion 11 which is a circular rearwardly projecting portion and which has a tubular rearwardly extending projection 115. With reference to FIG. 5, a journal member 22 has a hollow neck part 223 which receives and which is screwed to the rearwardly extending projection 115, and a clamping flange 225 which extends radially and outwardly from an end of the neck part 223 opposite to the LCD screen unit 1.

Figure 3:
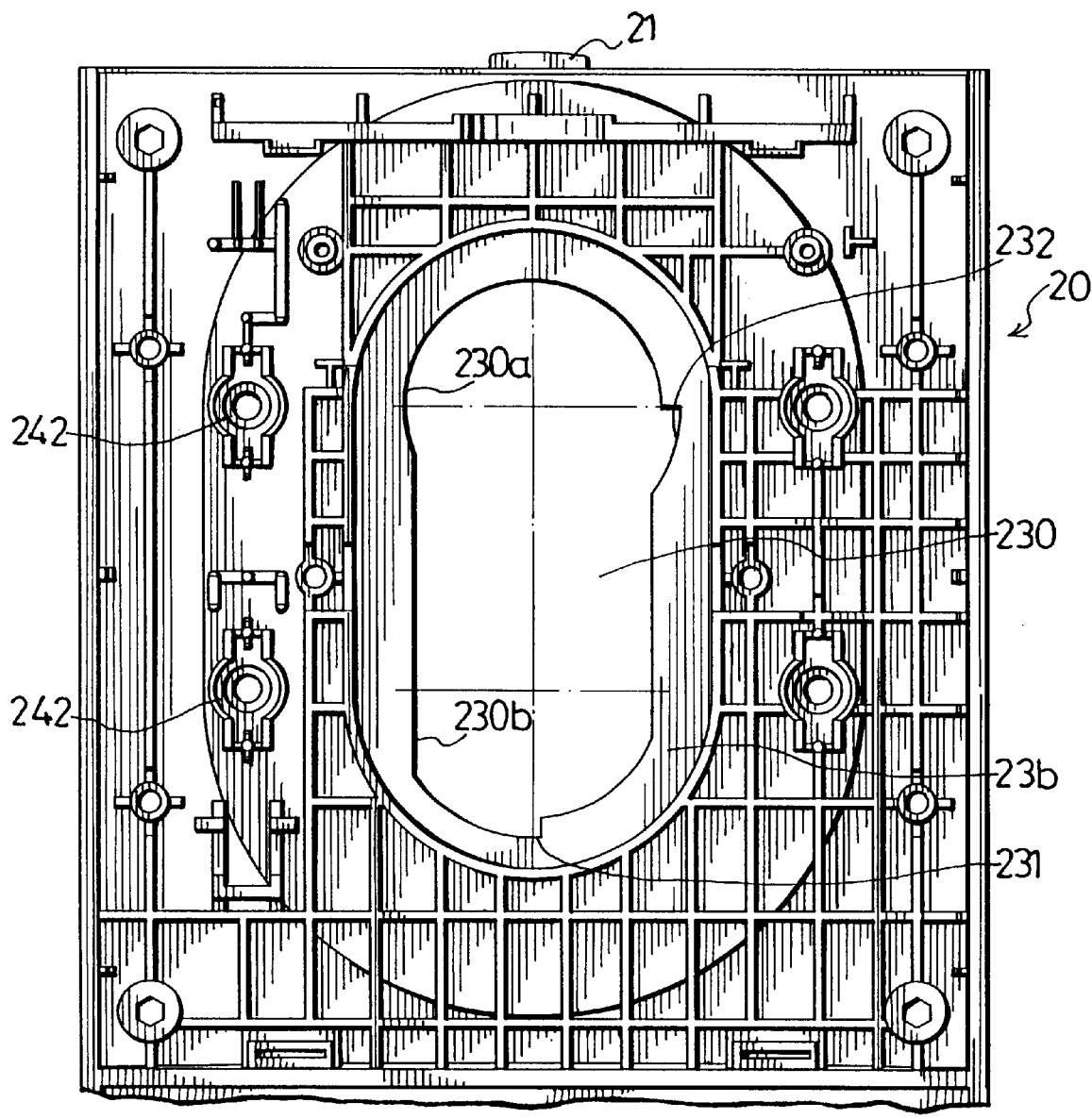
FIG. 3 is a plan view showing one side of a portion of a support of the LCD screen device according to the preferred embodiment.
Figure 4:
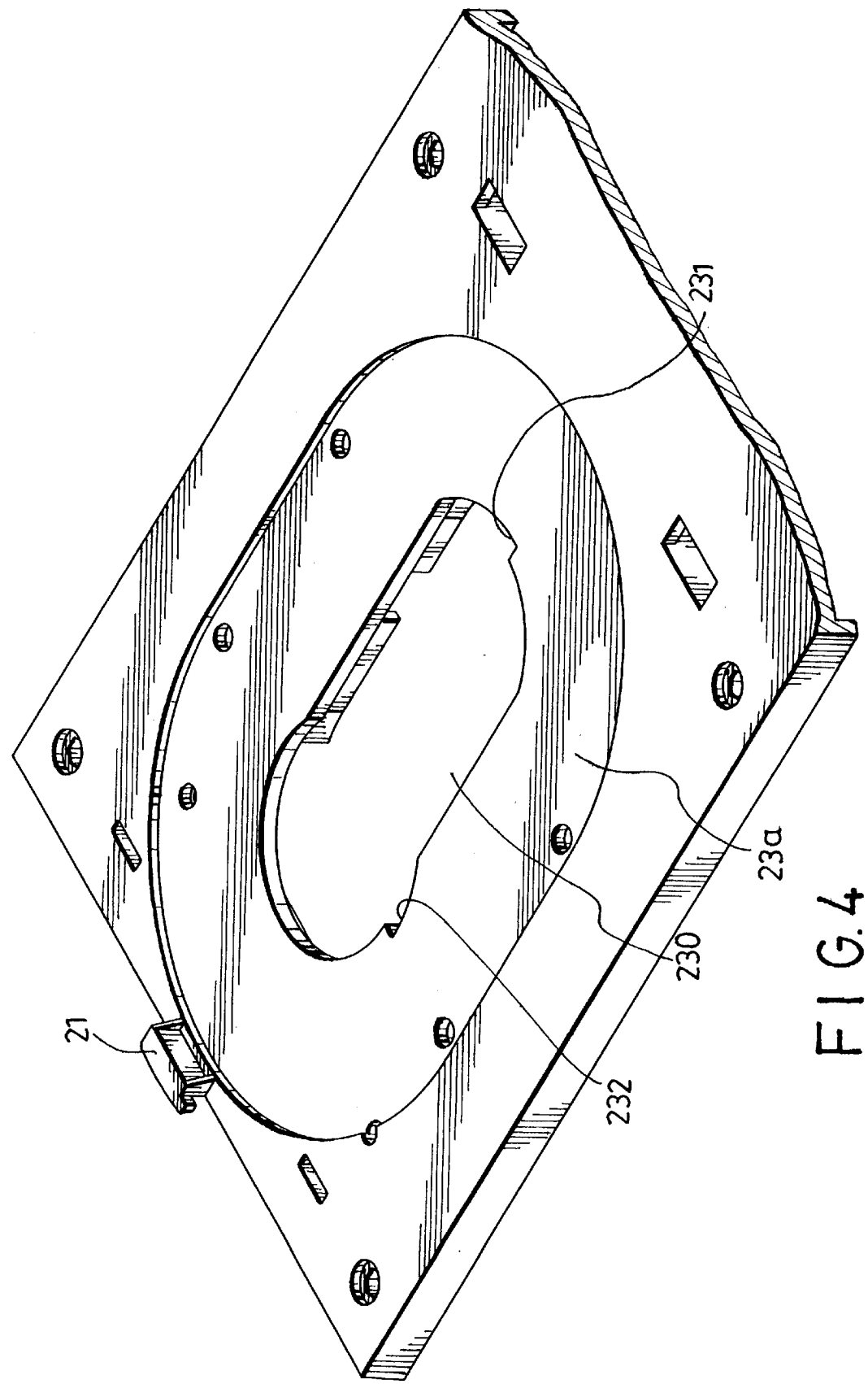
FIG. 4 is a perspective view when viewed from the other side portion of the support.

With reference to FIGS. 2, 3 and 4, the support 2 includes a vertical flat support portion 20 which has a guide rail 23 to confine a guide hole 230 for permitting the neck part 223 to pass horizontally therethrough. The guide hole 230 is elongated in a vertical direction and has a vertical longitudinal axis, and opposite interconnecting upper and lower rounded hole parts 230a, 230b with horizontal transverse axes that cross the vertical longitudinal axis. As shown in FIGS. 3 and 4, the guide rail 23 has a front slide face 23a in contact with the central portion 11, and a rear slide face 23b in contact with the clamping flange 225.

Referring again to FIGS. 2 and 3, a limiting mechanism for limiting the turning angle of the LCD screen unit 1 includes an upper engagement notch 232 which is formed in the guide rail 23 in connection with the upper hole part 230a, and a lower engagement notch 231 which is formed in the guide rail 23 in connection with the lower hole part 230b. The lower engagement notch 231 is provided substantially at a location where the vertical axis of the guide hole 230 meets the guide rail 23. The upper engagement notch 232 is provided substantially at a location where the horizontal transverse axis of the upper hole part 230a meets the guide rail 23. An engagement projection 224 (see FIG. 5) is formed on the neck part 223 to engage the upper engagement notch 232 when the neck part 223 is received in the upper hole part 230a, and to engage the lower engagement notch 231 when the neck part 223 is received in the lower hole part 230b. A tongue 21 is provided on the flat support portion 20 above the upper hole part 230a substantially in alignment with the vertical axis of the guide hole 230. A limit groove 12 is formed in the back side 10, and includes a vertical slide groove 121 which extends upward from the circumference of the central portion 11 along the direction of the vertical axis of the guide hole 230, and an arched slide groove 122 which extends along the circumference of the central portion 11 and which has one end connected to the vertical slide groove 121 and which extends to an angular distance of substantially 90 degrees so as to receive slidably the tongue 21 and so as to limit the movement of the tongue 21 when the LCD screen unit 1 is turned relative to the support 2.

A locking mechanism for locking the LCD screen unit 1 against turning movement includes a plurality of latch holes 112 which are formed in the circular rearwardly projecting portion of the central portion 11 and which are circumferentially spaced apart by an angle of 90 degrees. Two latch members 34 are provided on the flat support portion 20 at one side of the guide hole 230 in a vertically spaced relationship. One of the latch members 34 engages releasably the corresponding latch hole 112 when the LCD screen unit 1 is in the first position. The other latch member 34 engages the corresponding other latch hole 112 after the LCD screen unit 1 is turned 90 degrees. The flat support portion 20 is formed with two hollow seats 242 to permit passage of the latch members 34. Two mounting members 33 have holes 331 and are mounted respectively on the hollow seats 242. Each latch member 34 is loaded with a spring 35. When the latch member 34 is not locked, it is biased by the spring 35 toward the corresponding latch hole 112. An elongated locking member 3 is mounted on the flat support portion 20, and includes a movable locking plate 31 which is provided adjacent to the latch members 34 opposite to the latch holes 112 and which extends in a direction perpendicular to the direction of the biasing of the springs 35 so as to lock the latch members 34 in the latching position thereof relative to the latch holes 112. The locking plate 31 is perforated to form two releasing holes 313. When the latch members 34 and the holes 331 of the mounting member 33 are aligned with the releasing holes 313 respectively, the latch members 34 are movable outward from the latch holes 112 against the action of the springs 35. The latch members 34 are locked in the latch holes 112 when they are not in alignment with the releasing holes 313. In addition, the locking plate 31 has a lower end 315 which is releasably inserted into a lock unit 36 that is secured on the flat support portion 20. The lock unit 36 is conventional and is able to hold therein the lower end 315 of the locking plate 31 when the latter is pushed into the former. When the lower end 315 is pushed toward the lock unit 36, the lower end 315 can be released from the lock unit 36. A spring 32 is provided longitudinally in the locking plate 31, and has one end abutting against the flat support portion 20 to actuate the locking plate 31 upward when the lower end 315 is released from the lock unit 36. The locking plate 31 further has an upper push button 311 that projects upward from a hole 27 formed in the flat support portion 20 for manual pushing operation.

In order to reinforce the connection of the LCD screen unit 1 and the support 2 when the LCD screen unit 1 is locked, two additional latch members 261 are provided on the support 2 to engage releasably the latch holes 112 on the other side of the guide hole 230. Two mounting members 262 are mounted on the flat support portion 2 to hold the latch members 261, respectively. Each latch member 261 is loaded with a spring 263 like the latch members 34.

Figure 6:
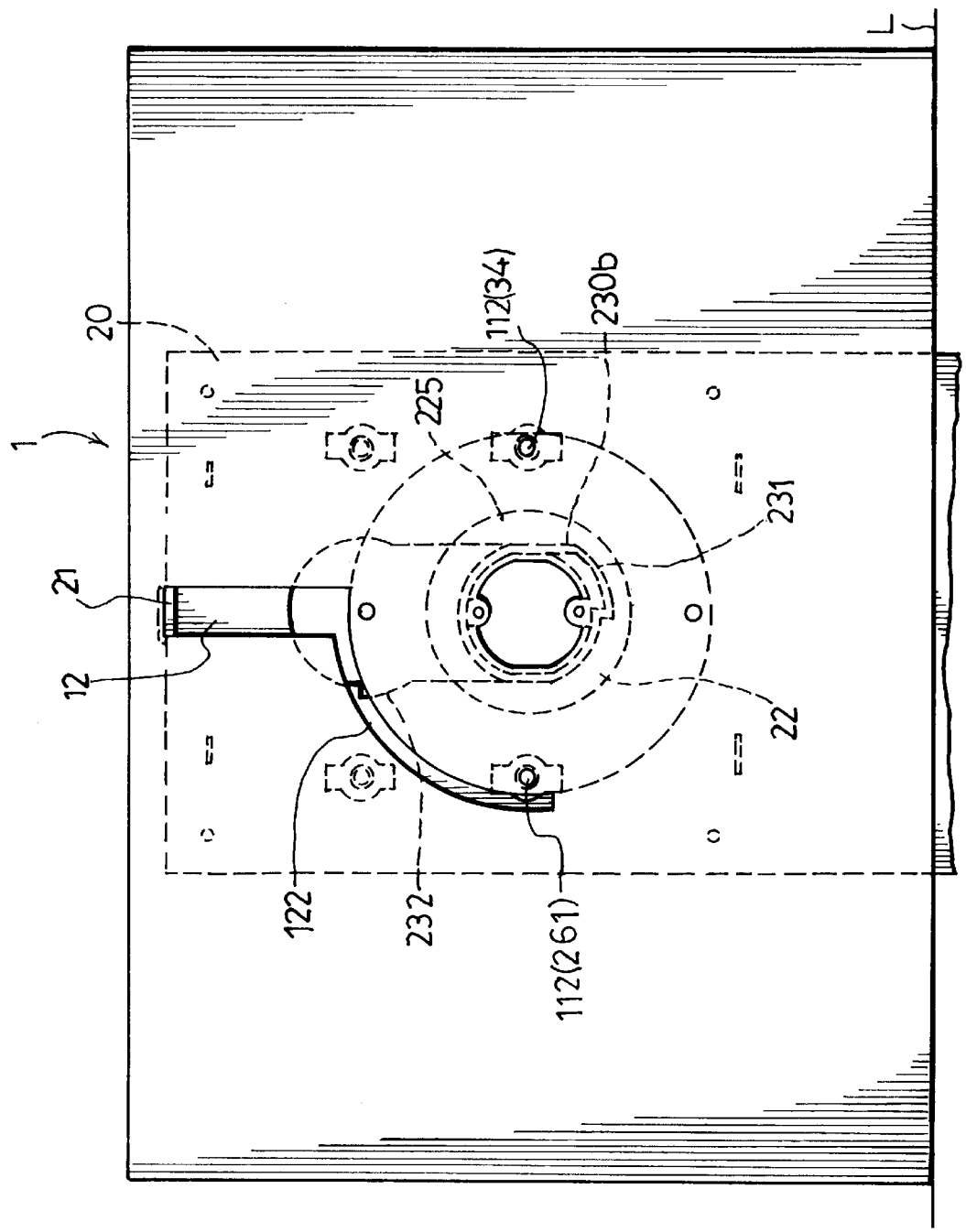
FIG. 6 is a schematic view showing the LCD screen unit in a first position.

FIG. 6 shows the LCD screen unit 1 according to this invention in a first position where the length of the LCD screen unit 1 lies horizontally. With reference to FIG. 2, in this state, the neck part 223 is received in the lower hole part 230*b*. The engagement projection 224 engages the lower engagement notch 231, and one of the latch members 34 and one of the latch members 261 engage corresponding two of the latch holes 112 on two opposite sides of the guide hole 230 to lock the LCD screen unit 1 against movement relative to the flat support portion 20.

Figure 7:
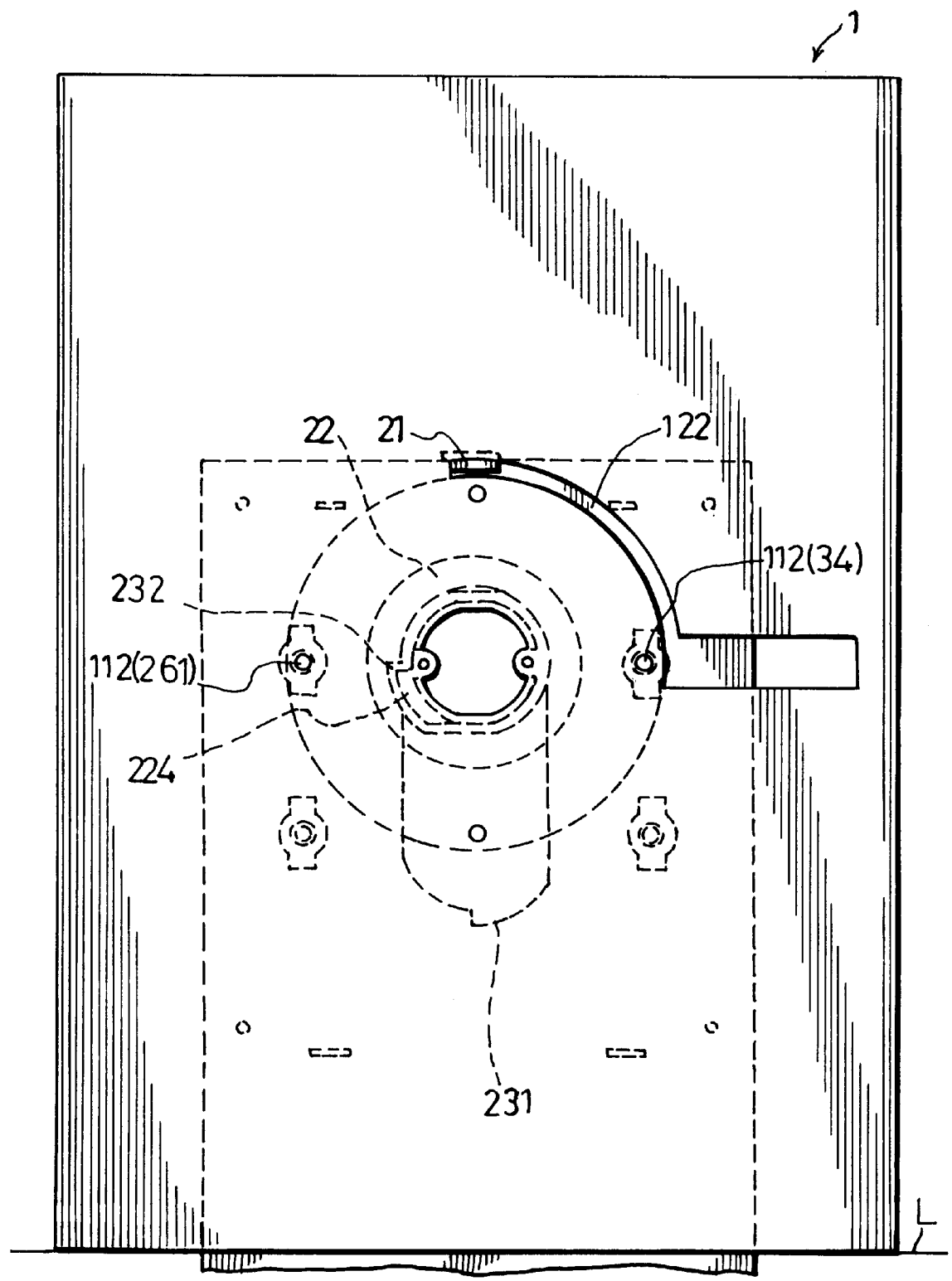
FIG. 7 is a schematic view showing the LCD screen unit in a second position.

For changing the LCD screen unit 1 into a second position where the width of the LCD screen unit 1 lies horizontally, the upper push button 311 is first pushed downward so that the releasing holes 313 are aligned with the latch members 34 to permit the latch members 34, 261 to pass therethrough, thereby releasing the latch members 34 from the latch holes 112. With reference to FIG. 7, the LCD screen unit 1 is lifted upward and is subsequently rotated clockwise about 90 degrees in such a manner that the tongue 21 slides along the limit groove 12 from the top of the vertical slide groove 121 to the other end of the arched slide groove 122. After the engagement projection 224 engages the upper engagement notch 232, the other one of the latch members 34 and the other one of the latch members 261 engage the corresponding latch holes 112 to lock the LCD screen unit 1 against movement relative to the flat support portion 20.

As shown in FIGS. 6 and 7, note that the bottom end (L) of the LCD screen unit 1 lies on the same horizontal plane when placed in the first or second positions because the LCD screen unit 1 is lifted during the change from the first position to the second position.

Moreover, the LCD screen unit 1 is lifted and rotated stably by virtue of the engagement between the tongue 21 and the groove 12.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements in accordance with the invention defined by the appended claims.

We claim:

1. A rotatable LCD screen devise comprising:
    a substantially rectangular LCD screen unit having a length and a width, and including a front display side and a back side, said back side having a substantially central portion, and a journal member which has a neck part secured to said central portion and a clamping flange that extends radially and outwardly from said neck part and that is spaced from said central portion;
    an upright support connected rotatably to said back side for rotation of said LCD screen unit about a horizontal axis which is substantially perpendicular to the plane of said front display side so as to place said LCD screen unit selectively in a first position where said length lies horizontally, and a second position where said length extends vertically, said support including a substantially vertical flat support portion which has a guide hole, said guide hole being elongated in the vertical direction and having a vertical longitudinal axis, said neck part passing through said guide hole substantially horizontally, said clamping flange being disposed at one side of said flat support portion opposite to said central portion;
    locking means provided on said back side and said support for locking said LCD screen unit against movement relative to said support when said LCD screen unit is in said first position or said second position; and
    limiting means for limiting the angle of the rotation of said LCD screen unit relative to said support.

2. The rotatable LCD screen device as claimed in claim 1, wherein said neck part is hollow, said central portion of said back side being a rearwardly projecting portion and having a rearwardly extending projection to extend into and to be screwed to said neck part.

3. The rotatable LCD screen device as claimed in claim 1, wherein said guide hole has opposite interconnecting upper and lower rounded hole parts with horizontal transverse axes that cross the vertical longitudinal axis, said neck part being received in said lower hole part when said LCD screen unit is in said first position, said neck part being received in said upper hole part when said LCD screen unit is in said second position.

4. The rotatable LCD screen device as claimed in claim 3, wherein said flat support portion further has a guide rail confining said guide hole, said guide rail having a front slide face substantially in contact with said central portion, and a rear slide face substantially in contact with said clamping flange.

5. The rotatable LCD screen device as claimed in claim 4, wherein said limiting means includes an upper engagement notch formed in said guide rail in connection with said upper hole part, and a lower engagement notch formed in said guide rail in connection with said lower hole part, said lower engagement notch being provided substantially at a location where the vertical axis of said guide hole meets said guide rail, said upper engagement notch being provided substantially at a location where the horizontal axis of said upper hole part meets said guide rail, said neck part having an engagement projection to engage said upper engagement notch when received in said upper hole part and to engage said lower engagement notch when received in said lower hole part.

6. The rotatable LCD screen device as claimed in claim 4, wherein said limiting means has a tongue which is provided on said flat support portion, and a limit groove which is formed in said back side to receive slidably and limit the movement of said tongue when said LCD screen unit is turned relative to said support.

7. The rotatable LCD screen device as claimed in claim 6, wherein said rearwardly projecting portion of said central portion is circular, said tongue being provided on said flat support portion above said upper hole part substantially in alignment with said vertical axis of said guide hole, said limit groove including a vertical slide groove which extends upward from the circumference of said central portion along the direction of said vertical axis of said guide hole when said LCD screen unit is in said first position for permitting vertical movement of said neck part in said guide hole, and an arched slide groove which extends along the circumference of said central portion and which has one end connected to said vertical slide groove and another end extending downward from said vertical slide groove to an angular distance of substantially 90 degrees to result in limited rotational movement of said LCD screen unit relative to said support.

8. The rotatable LCD screen device as claimed in claim 3, wherein said locking means includes at least two latch members which are formed in said flat support portion at one side of said guide hole and which are aligned along a line parallel to the vertical axis of said guide hole, said locking means further including at least two latch holes which are provided circumferentially on said central portion and which are spaced angularly by a distance of substantially 90 degrees, one of said latch members releaseably engaging the respective one of said latch holes in said first position of said LCD screen unit, the other one of said latch members releaseably engaging the other one of said latch holes in said second position of said LCD screen unit, said locking means further including a locking member mounted on said flat support portion so as to prevent either one of said latch members from disengaging from the respective one of said latch holes.

9. The rotatable LCD screen device as claimed in claim 8, wherein each of said latch members is loaded with a spring and is biased by said spring to move into the respective one of said latch holes, said locking member including a movable locking plate which is provided adjacent to said latch members opposite to said latch holes and which extends in a direction perpendicular to the direction of the biasing of said spring, said locking plate being perforated to form releasing holes which permit said latch members to move outward from said latch holes when said locking plate is moved to align said releasing holes with said latch members respectively, said locking plate further having a push button for manual pushing of said locking plate so as to move said releasing holes out of alignment with said latch members and to prevent said latch members from moving out of said latch holes.

* * * * *